United States Patent
Rink et al.

(10) Patent No.: US 6,332,404 B1
(45) Date of Patent: Dec. 25, 2001

(54) AIRBAG INFLATION GAS GENERATION VIA A DISSOCIATING MATERIAL AND THE MODERATION THEREOF

(75) Inventors: Karl K. Rink, Liberty, UT (US); Walter A. Moore, Parker, CO (US); David J. Green, Brigham City; Ivan V. Mendenhall, Providence, both of UT (US)

(73) Assignee: Autoliv ASP, Inc., Ogden, UT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/495,975

(22) Filed: Feb. 2, 2000

Related U.S. Application Data

(63) Continuation-in-part of application No. 09/112,838, filed on Jul. 10, 1998, now Pat. No. 6,289,814, which is a continuation-in-part of application No. 09/027,020, filed on Feb. 20, 1998, now Pat. No. 6,117,254, and a continuation-in-part of application No. 09/005,274, filed on Jan. 9, 1998, now Pat. No. 6,170,867, and a continuation-in-part of application No. 08/935,016, filed on Sep. 22, 1997, now Pat. No. 5,884,938, which is a continuation-in-part of application No. 08/632,698, filed on Apr. 15, 1996, now Pat. No. 5,669,629, and a continuation-in-part of application No. 08/935,014, filed on Sep. 22, 1997, now Pat. No. 5,941,562, which is a continuation-in-part of application No. 08/632,698, filed on Apr. 15, 1996, now Pat. No. 5,669,629.

(51) Int. Cl.[7] .................................................. C06D 5/00
(52) U.S. Cl. ....................... 102/530; 102/531; 280/741
(58) Field of Search ........................ 149/74, 1; 102/530, 102/531; 280/736, 737, 741

(56) References Cited

U.S. PATENT DOCUMENTS

| | | |
|---|---|---|
| 3,999,380 | 12/1976 | Williams . |
| 5,060,973 | 10/1991 | Giovanetti ............................ 280/736 |
| 5,076,607 | 12/1991 | Woods et al. ......................... 280/737 |
| 5,330,730 | 7/1994 | Brede et al. .......................... 280/736 |
| 5,466,313 | * 11/1995 | Brede et al. ............................. 149/1 |
| 5,470,104 | 11/1995 | Smith et al. .......................... 280/737 |
| 5,494,312 | 2/1996 | Rink ..................................... 280/737 |
| 5,504,288 | 4/1996 | Morin ................................ 200/83 D |
| 5,531,473 | 7/1996 | RinK et al. ........................... 280/737 |
| 5,536,339 | 7/1996 | Verneker ............................. 149/19.5 |
| 5,571,988 | 11/1996 | Hagel et al. ............................. 149/1 |
| 5,586,386 | 12/1996 | Morin ..................................... 29/622 |

(List continued on next page.)

FOREIGN PATENT DOCUMENTS

| | | |
|---|---|---|
| 27 09 733 | 9/1978 | (DE) . |
| WO 98/06682 | 2/1998 | (WO) . |

(List continued on next page.)

Primary Examiner—Michael J. Carone
Assistant Examiner—Aileen J. Baker
(74) Attorney, Agent, or Firm—Sally J. Brown; James D. Erickson

(57) ABSTRACT

An inflator apparatus for inflating an inflatable device and a method are provided wherein a combination of a dissociative gas source material and at least one unreactive dissociation reaction modifier is stored at least partially in liquefied form with the reaction modifier effective to moderate at least one of the temperature and concentration of the at least one gas source material upon the dissociation of at least a portion of the at least one gas source material.

38 Claims, 7 Drawing Sheets

U.S. PATENT DOCUMENTS

| | | | |
|---|---|---|---|
| 5,607,181 | 3/1997 | Richardson et al. | 280/737 |
| 5,649,720 | 7/1997 | Rink et al. | 280/737 |
| 5,669,692 | 9/1997 | Rink | 280/741 |
| 5,673,933 | 10/1997 | Miller et al. | 280/736 |
| 5,683,104 | 11/1997 | Smith | 280/736 |
| 5,725,699 * | 3/1998 | Hinshaw et al. | 149/19.1 |
| 5,735,118 * | 4/1998 | Hinshaw et al. | 60/219 |
| 5,762,369 | 6/1998 | Mooney et al. | 280/741 |
| 5,803,493 | 9/1998 | Paxton et al. | 280/737 |
| 5,806,885 | 9/1998 | Hock | 20/737 |
| 5,884,938 | 3/1999 | Rink et al. | 280/741 |
| 5,924,728 * | 7/1999 | Evans et al. | 280/741 |
| 5,941,562 | 8/1999 | Rink et al. | 280/737 |
| 6,098,548 * | 8/2000 | Rink et al. | 102/531 |
| 6,117,254 * | 9/2000 | Rink et al. | 149/35 |

FOREIGN PATENT DOCUMENTS

| | | |
|---|---|---|
| 00/02749 | 1/2000 | (WO) . |
| 00/58134 | 10/2000 | (WO) . |

* cited by examiner

AIRBAG INFLATION GAS GENERATION VIA A DISSOCIATING MATERIAL AND THE MODERATION THEREOF

CROSS REFERENCE TO RELATED APPLICATIONS

This application is a continuation-in-part of application Ser. No. 09/112,838, filed on Jul. 10, 1998 now Pat. No. 6,289,814, which in turn is a continuation-in-part application of prior U.S. patent applications, U.S. Ser. No. 09/027,020 filed on Feb. 20, 1998, now Rink et al.; U.S. Pat. No. 6,117,254, issued Sep. 12, 2000, U.S. Ser. No. 09/005,274, filed on Jan. 9, 1998, now Rink et al., U.S. Pat. No. 6,170,867, issued on Jan. 9, 2001; U.S. Ser. Nos. 08/935,014 and 08/935,016, now Rink et al., U.S. Pat. No. 5,941,562, issued Aug. 24, 1999 and Rink et al., U.S. Pat. No. 5,884,938, issued Mar. 23, 1999, each respectively filed on Sep. 22, 1997 as a continuation-in-part application of application U.S. Ser. No. 08/632,698, filed on Apr. 15, 1996, now Rink, U.S. Pat. No. 5,669,629, issued Sep. 23, 1997. The disclosures of each of prior U.S. patent application Ser. Nos. 08/935,014 (now Rink et al., U.S. Pat. No. 5,941,562, issued Aug. 24, 1999) and Ser. No. 08/935,016 (now Rink et al., U.S. Pat. No. 5,884,938, issued Mar. 23, 1999) each respectively filed on Sep. 22, 1997, and U.S. patent application Ser. No. 08/632,698, filed on Apr. 15, 1996 (now Rink, U.S. Pat. No. 5,669,629, issued Sep. 23, 1997) is hereby incorporated by reference herein and made a part hereof, including but not limited to those portions which specifically appear hereinafter.

BACKGROUND OF THE INVENTION

This invention relates generally to inflatable restraint systems and, more particularly, to the generation of inflation gas used in such systems. More specifically, the invention relates to inflation gas generation via a dissociating material and the moderation thereof.

It is well known to protect a vehicle occupant using a cushion or bag, e.g., an "airbag cushion," that is inflated or expanded with gas when the vehicle encounters sudden deceleration, such as in the event of a collision. In such systems, an airbag cushion is normally housed in an uninflated and folded condition to minimize space requirements. Upon actuation of the system, the cushion begins to be inflated, in a matter of no more than a few milliseconds, with gas produced or supplied by a device commonly referred to as an "inflator."

"Rise rate", i.e., the rate at which the gas output from an inflator increases pressure, as measured when such gas output is directed into a closed volume, is a common performance parameter used in the design, selection and evaluation of inflator devices for particular vehicular airbag restraint system installations. It is commonly desired that an inflatable restraint airbag cushion initially inflate in a relatively gradual manner soon followed by the passage of inflation gas into the airbag cushion at a relatively greater or increased pressure rate. An inflator resulting in such inflation characteristics is commonly referred to in the field as producing inflation gas in accordance with an "S" curve.

Many types of inflator devices have been disclosed in the art for the inflating of one or more inflatable restraint system airbag cushions. Prior art inflator devices include both pyrotechnic inflators and compressed gas inflators. Unfortunately, each of these types of inflator devices has been subject to certain disadvantages.

For example, pyrotechnic inflators generally produce or derive inflation gas via the combustion of a gas generating material, i.e., a pyrotechnic. In practice, such gas generating materials can typically produce various undesirable combustion products, including various solid particulate materials. The removal of such solid particulate material, such as by the incorporation of various filtering devices within or about the inflator, undesirably increases inflator design and processing complexity and can increase the costs associated therewith. In addition, the temperature of the gases emitted from such inflator devices can typically vary between about 500° F. (260° C.) and 1200° F. (649° C.), dependent upon numerous interrelated factors including the desired level of inflator performance, as well as the type and amount of gas generant material used therein, for example. Consequently, airbag cushions used in conjunction with such inflator devices are commonly constructed of or coated with materials which are resistant to such high temperatures. For example, in order to resist being burned through as a result of exposure to such high temperatures, an airbag cushion such as constructed of nylon fabric can be coated with neoprene or the like temperature resistant material or include one or more neoprene coated nylon patches or the like placed at the locations of the airbag cushion at which the hot gas initially impinges. As will be appreciated, such specially fabricated or prepared airbag cushions typically are more costly to manufacture and produce.

The term "compressed gas inflator" is commonly used to refer to the various inflators which contain a selected quantity of compressed gas. For example, one particular type of compressed gas inflator, commonly referred to as a "stored gas inflator," simply contains a quantity of a stored compressed gas which is selectively released to inflate an associated airbag cushion.

A second type of compressed gas inflator, commonly referred to as a "hybrid inflator," typically supplies or provides inflation gas as a result of a combination of stored compressed gas with the combustion products resulting from the combustion of a gas generating material, e.g., a pyrotechnic.

In the past, stored gas inflators have been at a disadvantage, as compared to pyrotechnic inflators, in terms of size, weight and/or cost. This is especially significant in view of the general design direction toward relatively small, lightweight and economical modern vehicle components and assemblies. In particular, the need to store a gas within an inflator at relatively high pressures typically results in the need for thick-walled pressure vessels that tend to be more bulky, heavy and costly than otherwise desired.

Commonly assigned Smith et al., U.S. Pat. No. 5,470,104, issued Nov. 28, 1995; Rink, U.S. Pat. No. 5,494,312, issued Feb. 27, 1996; and Rink et al., U.S. Pat. No. 5,531,473, issued Jul. 2, 1996 disclose and relate to a new type of inflator device, sometimes called a "fluid fueled inflator." Such inflator devices typically utilize a fuel material in the form of a fluid, e.g., in the form of a gas, liquid, finely divided solid, or one or more combinations thereof, in the formation of an inflation gas for an airbag cushion. In one form of fluid fueled inflator, such a fluid fuel material is burned to produce gas which contacts a quantity of stored pressurized gas to produce inflation gas for use in inflating a respective inflatable device.

While such types of inflator devices can successfully overcome, at least in part, some of the problems associated with the prior types of inflator devices, there is a continuing need and demand for further improved apparatus and techniques for inflating an inflatable device such as an airbag.

In at least partial response thereto, further efforts have led to the development of apparatus for and methods of gas generation which at least in part rely on the decomposition or dissociation of a selected gas source material for gas generation. In particular, such developmental efforts have resulted in the development of an inflator device which is at least in part the subject of the above-identified patents: Rink, U.S. Pat. No. 5,669,629; Rink et al., U.S. Pat. No. 5,884,938; and Rink et al., U.S. Pat. No. 5,941,562. In one form of such newly developed inflator device, inflation gas is produced or formed, at least in part, via the decomposition or dissociation of a selected gas source material, such as in the form of a compressed gas and such as via the input of heat from an associated heat source supply or device. Nitrous oxide is a preferred gas source material disclosed in one or more of these patents. One or more of these patents disclose that such an apparatus for and method of gas generation can be helpful in one or more of the following respects: reduction or minimization of concerns regarding the handling of content materials; production of relatively low temperature, non-harmful inflation gases; reduction or minimization of size and space requirements and avoidance or minimization of the risks or dangers of the gas producing or forming materials undergoing degradation (thermal or otherwise) over time as the inflator awaits activation.

Nevertheless, there is a continuing need and demand for still further improved apparatus and techniques for inflating an inflatable device such as an airbag. In particular, there is an ongoing need and demand for such apparatus and methods which desirably favorably reduce one or more apparatus parameters such as weight, cost, complexity, and size, for example. Further, there is a continuing need and demand for such an improved apparatus and associated or corresponding inflation techniques or methods such as may either or both improve the safety and facilitate the ease of operation and manufacture.

SUMMARY OF THE INVENTION

A general object of the invention is to provide an improved apparatus and corresponding or associated method for inflating an inflatable device.

A more specific objective of the invention is to overcome one or more of the problems described above.

The general object of the invention can be attained, at least in part, through an improved apparatus for inflating an inflatable device and which apparatus includes a first chamber having contents which include at least one gas source material which, upon initiation, undergoes dissociation to form dissociation products used to inflate the inflatable device. More specifically, the apparatus is improved through the inclusion of at least one unreactive dissociation reaction modifier selected from a group consisting of $CO_2$, Xe, $SF_6$ and mixtures thereof. Such at least one unreactive dissociation reaction modifier is stored at least partially in liquefied form in fluid contact with the at least one gas source material in the first chamber. In accordance with a preferred embodiment of the invention, the at least one unreactive dissociation reaction modifier is effective to moderate at least one of the temperature and concentration of the at least one gas source material in the first chamber upon the dissociation of at least a portion of the at least one gas source material.

The prior art generally fails to provide an inflation apparatus and techniques for inflating an inflatable device wherein one or more apparatus parameters such as weight, cost, complexity, and size, for example, is reduced or minimized to as great an extent as may be desired. Further, the prior art generally fails to provide an inflation apparatus and associated or corresponding inflation techniques or methods such as improve either or both the safety and ease of operation and manufacture to as great an extent as may be desired.

The invention further comprehends a method for inflating an inflatable safety device in a vehicle. In accordance with one preferred embodiment of the invention, such method includes:

initiating an at least partially liquefied inflation gas-resulting combination including at least one gas source material and at least one unreactive dissociation reaction modifier selected from a group consisting of $CO_2$, Xe, $SF_6$ and mixtures thereof within a first chamber whereby at least a portion of the at least one gas source material dissociates to form dissociation products including at least one gaseous dissociation product and the at least one unreactive dissociation reaction modifier moderates at least one of the temperature and concentration of the at least one gas source material in the first chamber and releasing inflation gas comprising at least a portion of the at least one gaseous dissociation product and the at least one unreactive dissociation reaction modifier from the first chamber to inflate the inflatable safety device.

As used herein, references to "dissociation," "dissociation reactions" and the like are to be understood to refer to the dissociation, splitting, decomposition or fragmentation of a single molecular species into two or more entities.

"Thermal dissociation" is a dissociation controlled primarily by temperature. It will be appreciated that while pressure may, in a complex manner, also influence a thermal dissociation such as perhaps by changing the threshold temperature required for the dissociation reaction to initiate or, for example, at a higher operating pressure change the energy which may be required for the dissociation reaction to be completed, such dissociation reactions remain primarily temperature controlled.

An "exothermic thermal dissociation" is a thermal dissociation which liberates heat.

"Equivalence ratio" ($\phi$) is an expression commonly used in reference to combustion and combustion-related processes. Equivalence ratio is defined as the ratio of the actual fuel to oxidant ratio $(F/O)_A$ divided by the stoichiometric fuel to oxidant ratio $(F/O)_S$:

$$\phi(F/O)_A/(F/O)_S \quad (1)$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.)

For given temperature and pressure conditions, fuel and oxidant mixtures are flammable over only a specific range of equivalence ratios. Mixtures with an equivalence ratio of less than 0.25 are herein considered nonflammable, with the associated reaction being a decomposition reaction or, more specifically, a dissociative reaction, as opposed to a combustion reaction.

References herein to a "pyrotechnic" material, refer to a material which in its simplest form, consists of an oxidizing agent and a fuel that produce an exothermic, self-sustaining reaction when heated to the ignition temperature thereof.

References to the detection or sensing of "occupant presence" are to be understood to refer to and include detection and sensing of one or more of the size, weight, and/or positions of a particular occupant under consideration.

References to an "adaptive" inflation system and the like are to be understood to refer to inflatable device inflation wherein selected inflatable devices are inflated or inflated in a manner generally dependent on selected operating conditions such as one or more of ambient temperature, occupant presence, seat belt usage, seat position of the occupant and rate of deceleration of the motor vehicle, for example.

The terms "gas" and "liquid" as used to describe the form of matter, can be variously defined or described. For this reason a P, v, T diagram (where P is the pressure, v is the specific volume, and T is the temperature) provides a convenient means of considering the form of a substance. As will be understood by those familiar with thermodynamics, a phase of matter is generally considered a gas if it can be condensed (i.e., the specific volume of the material can be reduced) by a reduction of temperature while maintaining a constant temperature. To the layman, the terms "gas", "gases" and the like, as used herein, generally refer to a substance that boils at conditions of atmospheric pressure and at a temperature between absolute zero, i.e., −459.67° F. (−273.14° C.), and about 68° F. (20° C.). Eleven known chemical elements are gases: hydrogen, fluorine, chlorine, helium, argon, nitrogen, oxygen, krypton, xenon and radon. Further, many chemical compounds are, by this definition, gases including: nitric oxide, ammonia, and carbon dioxide, for example. In addition, one or more of either or both such gaseous elements or compounds can be combined to form various gaseous combinations such as air, for example.

Again, referring to P, v, T diagrams, a phase of matter can generally be considered a liquid if it can be vaporized by a reduction in pressure at constant temperature. Alternatively, however, a liquid may more simply be described to a layman as a substance (or a mixture of substances) that displays a "free" or discernable surface. Those skilled in the art will understand that, for a pure substance, a point exists (called the critical point) representing the highest temperature and pressure at which a species can exist in a gas/liquid equilibrium. At higher temperatures and pressure, the liquid and gas phases cannot be distinguished from one another because their properties become equivalent. Accordingly, matter occupying this region is sometimes called "supercritical" or simply a "fluid".

Finally, it will be understood by those skilled in the art that when considering a P, v, T diagram for a mixture of substances, the definition of the above regions becomes increasingly complex. While a complete description of an entire phase diagram for an arbitrary mixture of substances is well beyond the scope of this discussion, it is to be understood that practice of the invention is primarily concerned with co-existing mixtures of liquids and gases.

In turn, the term "compressed gases" and the like, as used herein, generally refers to those gaseous materials which are stored at pressures greater than atmospheric pressure. Compressed gases are defined (as in The Handbook of Compressed Gases, fourth edition, Compressed Gas Association, Kluwer Academic Publishers, Boston, Mass. (1999) ISBN- 0-412-78230-8), as either nonliquefied or liquefied compressed gases. Nonliquefied compressed gases are generally defined as those gases that do not liquefy at ordinary ambient temperatures, regardless of the pressure applied. Typically, nonliquefied compressed gases have low boiling points, generally less than about −130° F. (−90° C.), at atmospheric pressure.

As used herein, the terms "liquefied gas," "compressed liquefied gas" or the like are to be understood to refer to those gases that become liquids at temperatures greater than −40° C. and at pressures up to about 4500 psia (31.20 MPa).

The term "heat of vaporization" refers to the quantity of energy required to effect a change in the phase of a substance from a liquid to a gas. In general, the heat of vaporization of a material is proportional to the difference in relative volume of the liquid and gas phases for the material. As will be appreciated, different liquid materials are characterized by different heat of vaporization values. In addition, as the heat of vaporization parameter is commonly expressed in units of energy per unit mass, the amount of the material in the liquid phase is an important parameter in determining the required energy input for liquid-containing inflator devices.

As described above, the chemical constituent, amount of liquid and temperature can effect inflator performance. In particular, since the density of a particular liquid is known or can be measured, it is possible to relate the fraction of the total volume of an inflator pressure vessel occupied by the liquid phase, sometimes referred to herein as the "liquid fill fraction" or, more simply as the "fill fraction," to the mass of liquid present within the inflator. In practice, the use of the term fill fraction has oftentimes proven a more convenient form of measurement or differentiation of otherwise similar inflator devices.

Other objects and advantages will be apparent to those skilled in the art from the following detailed description taken in conjunction with the appended claims and drawings.

BRIEF DESCRIPTION OF THE DRAWINGS

FIG. 2 illustrates the airbag inflator in a normal or a "static" state. FIG. 3 illustrates the airbag inflator shown in FIG. 2 but now at an intermediate point in operation prior to the discharge of inflation gas therefrom. FIG. 4 illustrates the airbag inflator shown in FIG. 3 at a later still point in the operation thereof.

DETAILED DESCRIPTION OF THE INVENTION

Figure 1:
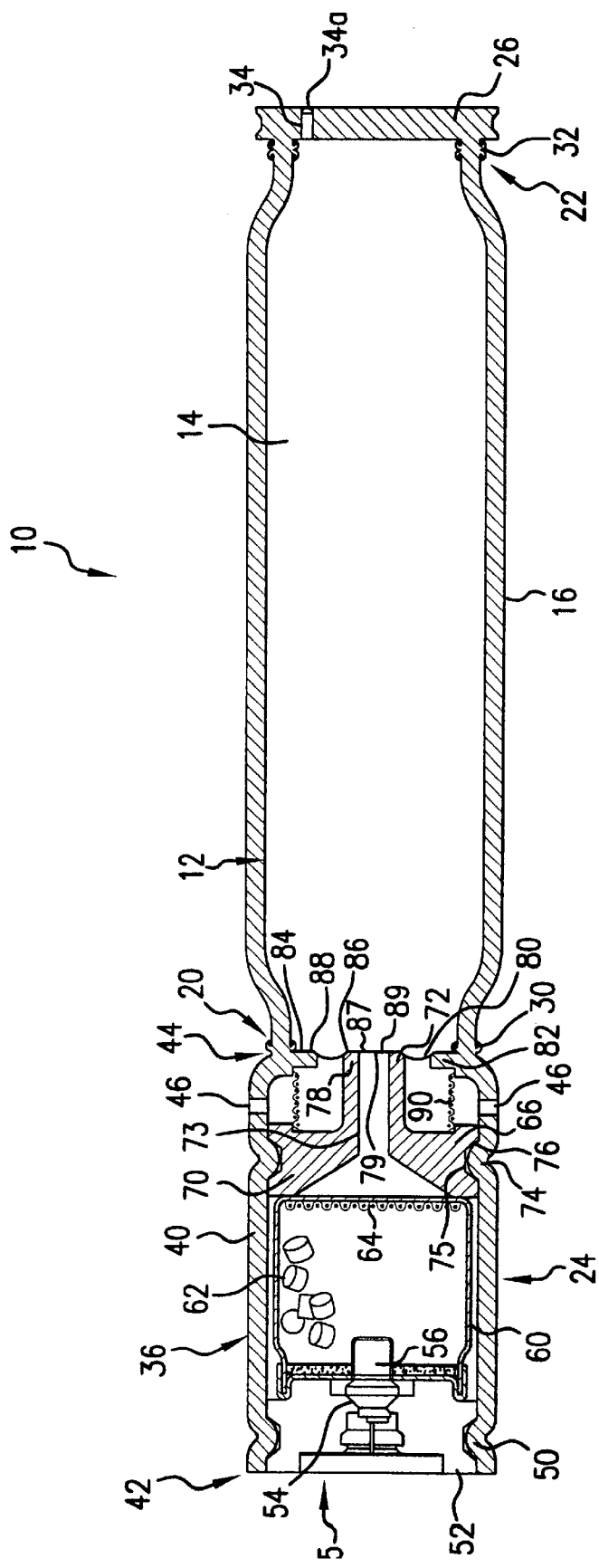
FIG. 1 is a partially in section, schematic drawing of an airbag inflator in accordance with one preferred embodiment of the invention.

The present invention may be embodied in a variety of different structures. As representative, FIG. 1 illustrates the present invention as embodied in an apparatus, generally designated by the reference numeral 10, in accordance with one embodiment of the invention. Such a gas producing or supplying device can advantageously be used to effect the inflation of an inflatable device such as an inflatable vehicle occupant restraint, e.g., an inflatable airbag cushion, (not shown). As described above, such a gas producing or supplying device is commonly referred to as an inflator.

While the invention is described below with particular reference to a passenger side airbag inflator apparatus such as can be used in association with various automotive vehicles including vans, pick-up trucks, and particularly automobiles, it is to be understood that the invention also has applicability not only with other types or kinds of vehicles including, for example, airplanes, and other types or kinds of airbag inflator apparatus for automotive vehicles including, for example, driver side and side impact airbag assemblies but also for the inflation of various inflatable devices such as may be apparent to those skilled in the art. With respect to automotive vehicles it will also be appreciated that due to usual physical differences between passenger, side impact and driver side airbag module assemblies, including the typical difference in size with passenger side airbags generally being-much larger than those used in side impact and driver side assemblies, the invention may have particular initial utility in passenger side airbag inflator apparatus. In addition, due to factors such as relatively large volume and extended stand-up times associated with inflatable devices of or in the form of inflatable curtains, inflation devices in accordance with the invention are believed to have particular practicality for use in conjunction with such inflatable devices, as are known in the art.

Returning to FIG. 1, the inflator apparatus 10 includes a first or storage chamber 12 that is filled and pressurized with fluid contents, designated by the reference numeral 14, generally effective to provide a gaseous inflation medium such as may be used in the inflation of an associated inflatable device. In accordance with a preferred embodiment of the invention, the fluid contents 14 include at least one gas source material which, upon initiation, undergoes dissociation to form dissociation products used to inflate the inflatable device, and at least one unreactive dissociation reaction modifier, as described in greater detail below.

Each of such at least one gas source material and at least one unreactive dissociation reaction modifier is preferably in the nature of a compressed gas or a compressed gas mixture. Such compressed gases can be stored in gaseous, liquid or multi-phase form (i.e., partially gaseous and partially liquid mixture). As will be appreciated, the premium on size generally placed on modem vehicle design, generally results in a preference for smaller sized airbag inflators. In view thereof and the fact that the densities for such compressed gas materials are significantly greater when in a liquid, rather than gaseous form, storage of such compressed gas materials primarily in a liquid form will typically be preferred.

In view of the above, the first chamber 12 is sometimes referred to herein as a gas/liquid storage chamber or as simply a storage chamber and, in the case of an inflator operating with a dissociative material, a "dissociative" chamber.

As disclosed in the above-identified Rink, U.S. Pat. No. 5,669,629, a wide variety of gas source materials which undergo dissociative or decompositional reactions, preferably an exothermic such reaction, to form gaseous products are available. Such gas source materials include:

acetylene(s) and acetylene-based materials such as acetylene and methyl acetylene, as well as mixtures of such acetylene(s) and acetylene-based materials with inert gas(es);

hydrazines such as hydrazine ($N_2H_4$), mixtures of hydrazine(s) and water, methyl derivatives of hydrazine, as well as mixtures of such hydrazine materials with inert gas(es);

peroxides and peroxide derivatives such as methyl hyperoxide ($CH_3OOH$) and mixtures of methyl hyperoxide and methanol, hydrogen peroxide, alkyl hydroperoxides, propionyl and butyryl peroxides, as well as mixtures of such peroxides and peroxide derivatives with inert gas(es); and nitrous oxide ($N_2O$) and mixtures of nitrous oxide with inert gas(es), for example.

Generally, dissociative gas source materials used in the practice of the invention are preferably:

a.) non-toxic and non-corrosive both in the pre- and post-dissociation states;

b.) relatively stable at atmospheric conditions thus permitting and facilitating storage in a liquid phase, where a liquid, as compared to a gas, permits the storage of a greater amount of material in the same volume at a given pressure;

c.) do not require the presence of catalyst(s) to trigger the dissociation reaction, and which catalysts may be difficult to remove or handle; and d.) form products of dissociation which do not contain undesirable levels of undesirable species, such as carbonaceous material (e.g., soot), $CO_x$, $NO_x$, $NH_3$, for example.

A currently preferred dissociative gas source material for use in the practice of the invention is nitrous oxide ($N_2O$). Nitrous oxide is advantageously generally non-toxic and non-corrosive. Further, nitrous oxide, as compared to gases such as air, nitrogen and argon, liquefies relatively easily at ambient temperatures. Additionally, nitrous oxide is relatively inert up to temperatures of about 200° C. or more. As a result, nitrous oxide is desirably relatively safe to handle, thermally stable, facilitates storage, and alleviates manufacturing concerns. Further, in accordance with the chemical reaction (2) identified below, the dissociation products produced or formed upon the dissociation of nitrous oxide ideally are nitrogen and oxygen:

$$2N_2O = 2N_2 + O_2 \qquad (2)$$

Thus, not only does such reaction form products which are generally non-toxic and non-corrosive but also results in the production or formation of molecular oxygen. As will be appreciated, such oxygen may then be available for subsequent reaction such as may result in further or enhanced inflation gas production or formation.

It is to be understood that such nitrous oxide can be stored in a gaseous, liquid or multi-phase form (i.e., partially gaseous and partially liquid mixture), as may be desired in particular applications or installations. In view of the above-identified general preference for smaller sized airbag inflators and the fact that the density of nitrous oxide is significantly greater when in a liquid, rather than gaseous form, one preferred embodiment of the invention involves storage of nitrous oxide primarily in a liquid form.

As detailed below, it has been found generally desirable to limit or otherwise control the concentration of the dissociative gas source material within the chamber 12 through the inclusion of at least one unreactive dissociation reaction modifier. Further, such at least one unreactive dissociation reaction modifier is preferably stored at least partially in liquefied form in fluid contact with the at least one gas source material in the chamber 12.

In practice, it has been found that the rate of dissociation of a gas source material, such as nitrous oxide, is generally proportional to the concentration of the gas source material within a vessel. Consequently, through the inclusion or presence of such at least one unreactive dissociation reaction modifier with the at least one gas source material in the chamber 12, the concentration and thus the pressure generated or resulting in the chamber can be desirably controlled or limited.

For example, the presence or inclusion of such a gas source material at relatively high concentrations (e.g., in excess of about 80 mole percent or more) can generally result in the generation of significantly high pressures within the associated vessel. In practice, pressure vessels required to be able to withstand such high pressures must generally be made with increased structural strength, such as by being made with walls of increased thickness. However, increasing the thickness of such vessel walls generally undesirably increases the weight of the associated vessel.

Further, the inclusion or presence of such a gas source material at relatively high concentrations can also result in increased gas exit temperatures from the vessel. As those skilled in the art will appreciate, various precautions may be desired or required in or with inflation assemblies and methods which produce higher temperature gases. For example, gas treatment assemblies such as cooling screens or the like may need to be included or used in conjunction therewith. The need for inclusion or presence of such added features can undesirably impact apparatus parameters such as cost, weight and size, for example.

In addition, the inclusion or presence the dissociative gas source material nitrous oxide at such concentrations can possibly result in other undesirable consequences such as, for example:

1) relatively high emissions of undesirable products of dissociation, such as either or both nitrogen dioxide ($NO_2$) and nitric oxide (NO), for example, and
2) liberation of relatively high concentrations of heated oxygen as a product of dissociation.

While the desirability storing or containing dissociative gas source materials such as nitrous oxide at least partially in liquefied form has been identified above, the liquid fill fraction of such inflator devices can strongly affect inflator performance. During inflator operation, the gas source material, e.g., nitrous oxide, is heated from ambient temperature to the temperature at which dissociation occurs. As such dissociation is understood to primarily occur in the gaseous phase, then if the inflator originally contains such gas source material in a liquid or partially liquid form, the gas source material must be first vaporized and then heated to the dessication temperature. As will be appreciated, the additional heat required to vaporize the liquid can be quite substantial. Thus, generally speaking, the amount of heat required to be produced or supplied to the gas source material can be significantly increased when the gas source material is stored or contained in a liquid or partially liquid form.

Those skilled in the art and guided by the teachings herein provided will appreciate that various unreactive dissociation reaction modifiers can be used in accordance with the invention. Preferred reaction modifiers for use in the practice of the invention are desirably unreactive with the gas source material. That is, while the reaction modifier desirably influences, i.e., slows, the rate of dissociation, the reaction modifier preferably does not itself participate in the reactions occurring with the chamber. In particular, preferred reaction modifiers in accordance with the invention will not degrade or otherwise react when exposed to anticipated inflator environments.

A general characteristic of matter in a liquid phase is that such phase results in or provides a relatively greater density as compared to the corresponding gaseous phase, at an equivalent temperature. Thus, through the incorporation of matter in a liquid phase, the mass of matter held or contained within a given volume can be advantageously increased. As will be appreciated by those skilled in the art and guided by the teachings herein provided, significant size reductions can be realized as a result of the increase in density afforded by storing or containing materials in liquid, as compared to gaseous, form. Moreover, through such utilization of the liquid phase of matter, such an increase in mass can be realized without necessitating operation at higher (e.g., supercritical) pressures and may therefore afford desirable advantages in inflator design.

Thus, preferred reaction modifiers for use in the practice of the invention are desirably conducive to liquefaction at the temperatures typically associated with airbag inflatable restraint operation. For example, airbag inflators are typically or usually designed to provide or result in desired operation over a temperature range of about −40° C. to about 110° C. Thus, the incorporation and use of reaction modifiers conducive to liquefaction at such temperatures is generally preferred.

In view of the above, preferred reaction modifiers for use in the practice of the invention can desirably be selected from the group consisting of $CO_2$, Xe, $SF_6$ and mixtures thereof. A particularly preferred reaction modifier for use in the practice of the invention is carbon dioxide.

Those skilled in the art and guided by the teachings herein provided will appreciate that carbon dioxide provides or exhibits a number of qualities or characteristics which make such use thereof particularly attractive, particularly when used in combination with the dissociative gas source material nitrous oxide.

First, both carbon dioxide and nitrous oxide can be relatively easily liquefied. For example, both carbon dioxide and nitrous oxide can be liquefied at ambient temperature at relatively low pressures. Since the density of both liquid phase carbon dioxide and nitrous oxide are significantly greater than the corresponding gaseous phases, the mass of material storable within a given volume is significantly greater for the liquid, as compared to the gaseous form. As a result, corresponding inflator devices of having a significantly reduced envelope can be used.

Further, the storage pressure useable with such nitrous oxide-carbon dioxide mixtures or combinations is relatively low, when compared to typical inert gas mixtures. For example, a 135-gram load of a 50/50 molar fluid mixture of nitrous oxide/carbon dioxide can be held in a 14 cubic inch (229.4 cubic centimeters) volume at about 832 psi (5.74 MPa) at 20° C. At these conditions, the liquid fill fraction is about 60–65%. In contrast, the storage of a 90/10 molar mixture of argon and helium in the same volume (i.e., 229.4 cubic centimeters) and at the same temperature (i.e., 20° C.) results in a storage pressure of about 6325 psia (43.61 MPa). Further, the storage of a 135-gram load of a 20/70/10 molar mixture of nitrous oxide/argon/helium in a 229.4 cubic centimeter volume and at a temperature of 20° C. results in a storage pressure of about 5468 psia (37.7 MPa). As will be appreciated, the use of lower storage pressures, such as realizable with the subject fluid mixtures can advantageously relieve the structural requirements for the vessel and, as a result, a lighter weight design can be used.

Thus, preferred dissociation reaction modifiers, in accordance with the invention, are generally effective to moderate at least one of the temperature and concentration of the at least one gas source material in the first chamber upon the dissociation of at least a portion of the at least one gas source material. To that end, it is generally preferred that such dissociation reaction modifiers be included in the chamber 12 in a sufficient relative amount such that the concentration of the gas source material, e.g., nitrous oxide, within the chamber is no more than about 80 mole percent. In practice, the chamber 12 content of the reaction modifier is preferably in the range of about 20 to about 90 molar percent, more preferably the chamber 12 content of the reaction modifier is in the range of about 30 to about 85 molar percent and, even more preferably, the chamber 12 content of the reaction modifier is in the range of about 40 to about 80 molar percent. More particularly, operation within such ranges has been found to generally result in suitable inflator performance for inflatable restraint system applications over typical temperature design specifications.

Further, the liquid fill fraction for the chamber 12 is preferably in the range of about 10 to about 95 percent by volume, more preferably, in the range of about 30 to about 85 percent by volume and, even more preferably, in the range of about 50 to about 75 percent by volume, where such quoted fill fractions are at an ambient temperature of 21° C. For example, the use of liquids in lesser relative amounts can significantly reduce or minimize any benefits relating to the use of liquid rather than gaseous forms. Further, the use of liquids in greater relative amounts can undesirably introduce design difficulties such as associated with potentially high internal pressures which may result upon heating and resulting liquid expansion.

While the chamber 12 need not contain materials other than at least one gas source material and at least one unreactive dissociation reaction modifier, as described above (e.g., the chamber contents include no more than minor levels of other materials, such as air as may be present in the dissociative chamber prior to being filled with the dissociative gas source material), the chamber may, if desired, additionally contain at least certain other materials, as described below. For example, an inert gas such as helium can be included with chamber contents to facilitate leak checking of the inflator apparatus or, more specifically, of the dissociative chamber thereof. Alternatively or in addition, an inert gas, such as argon and helium, for example, as well as materials such as nitrogen and carbon dioxide, which are essentially inert under such processing conditions, or various combinations thereof can be included such as to supplement the gas produced or formed upon the dissociation of the nitrous oxide. For example, in accordance with one alternative embodiment of the invention, the chamber 12 contains about 50 mole percent nitrous oxide, about 40 mole percent carbon dioxide and about 10 mole percent helium as a liquid and gas mixture. It is to be understood, however, that as helium does not generally liquefy under the conditions here of interest, the inclusion thereof can detrimentally significantly increase the fluid storage pressures associated with the resulting assemblies.

Additionally or alternatively and as disclosed in the above-identified Rink, U.S. Pat. No. 5,884,938, the chamber 12 may contain a quantity of at least one radioactive isotope leak trace material whereby fluid leakage from the chamber can be detected as disclosed in therein.

In addition, if desired, the chamber 12 may additionally contain a quantity of oxygen gas such as in molecular form and such as may either or both beneficially or desirably supplement such molecular oxygen as may be formed upon the dissociation of stored or included nitrous oxide.

Still further, such a chamber 12 can, if and as desired, also include a sensitizer material to promote or accelerate the rate of such dissociative reaction. Various sensitizer materials disclosed and identified in above-identified Rink, U.S. Pat. No. 5,669,629. As disclosed therein, particularly useful sensitizer materials are typically hydrogen-bearing materials. Such sensitizer materials are generally added to the dissociative gas source material in small amounts. Specifically, the sensitizer material is preferably added to the dissociative gas source material in an amount below the flammability limits for the content mix, such that the contents of the dissociative chamber are generally at an equivalence ratio of less than 0.25, preferably less than 0.15. At such low relative amounts, the chamber contents are essentially non-flammable.

Hydrogen-bearing sensitizer materials useable in the practice of the invention are typically gaseous, liquid, solid, or multi-phase combinations thereof including hydrogen, hydrocarbons, hydrocarbon derivatives and cellulosic materials. Preferred hydrocarbon hydrogen-bearing sensitizer materials useable in the practice of the invention include paraffins, olefins, cycloparaffins and alcohols. Molecular hydrogen ($H_2$), which does not result in the formation of carbon oxides such as carbon monoxide or carbon dioxide, has been found to be quite effective as a sensitizer and is an especially preferred hydrogen-bearing sensitizer material for use in the practice of the invention.

The chamber 12 has been identified above in terms of a storage chamber for the storage of a fluid which includes at least one gas source material and at least one unreactive dissociation reaction modifier, as described above. As described in greater detail below, upon actuation and operation of the inflator 10, the chamber 12 may also desirably serve to provide a volume within which communication and heat transfer between combustion products formed in or by the inflator 12 and the chamber contents may desirably occur.

The chamber 12 is defined by an elongated generally cylindrical sleeve 16, such as desirably in the form of an open ended seamless tube. The sleeve 16 includes opposite first and second open ends, 20 and 22, respectively. An assembly, herein denominated a "diffuser assembly", generally designated by the reference numeral 24, is formed or appropriately joined or attached to the sleeve first end 20. A second end closure 26 is formed or appropriately joined or attached to the sleeve second end 22. For example and as shown in FIG. 1, the first sleeve end 20 can be swagged and the diffuser assembly 24 joined thereto such as by means of an inertial weld 30. Similarly, the second sleeve end 22 can be swagged and the second end closure 26 joined thereto such as by means of an inertial weld 32.

The second end closure 26 includes a fill port 34, as is known in the art, wherethrough materials can be passed into the chamber 12. After the storage chamber 12 has been filled, the fill port 34 can be appropriately blocked or plugged, as is known, such as by a pin or ball 34a. As will be appreciated, such a fill port, if included in the inflator apparatus, can alternatively be placed or positioned, as may be desired and understood by those skilled in the art. Thus, the broader practice of the invention is not necessarily limited to the inclusion of a fill port or the position or placement thereof.

The diffuser assembly 24 is a multi-component assembly such as may, at least in part, serve as, contain or hold a chamber opener 35, such as described in greater detail below and such as actuatable to produce a discharge effective to open the first chamber 12 by non-mechanical means, i.e., a discharge effective to open the first chamber 12 without necessitating the use of or reliance on mechanical opening devices such as projectiles or piston members, for example. In particular embodiments of the invention, such a discharge may be or take the form of a shock wave or other pressure disturbance, a hot product gas or other elevated temperature discharge or various combinations thereof, for example and as will be appreciated by those skilled in the art and guided by the teachings herein provided.

In accordance with one preferred embodiment of the invention, the chamber opener 35 may desirably take the form of or include a heat source such as may serve to initiate dissociation of the gas source material. As described in greater detail below, a suitable heat source for use in the practice of the invention may desirably include a selected initiator device and an associated supply of reactant material, such as in the form of a gas generant reactant material. It is to be understood, however, that the broader practice of the invention is not necessarily limited to the use of a chamber opener in the form of a heat source let alone the inclusion of a gas generant reactant material therein.

More specifically, the diffuser assembly 24 includes a housing 36 such as in the general form of a hollow tube side wall 40 having open first and second ends, 42 and 44, respectively. The side wall 40 includes a plurality of exit ports 46, wherethrough the inflation gas from the inflator 10 and, particularly the diffuser assembly 24, is properly dispensed into an associated airbag cushion (not shown). Thus, the diffuser assembly 24 can serve to facilitate direction and ballistic control of the inflation fluid from the inflator 10 into the associated inflatable airbag cushion. As will be appreciated by those skilled in the art, the number and positioning of placement of the exit ports can be selected to provide particular inflation performance characteristics required or desired in or of a particular inflator installation. In practice, four generally evenly circumferentially spaced exit ports have been found sufficient to generally provide a sufficiently even flow control of the inflation medium, from the inflator into an associated airbag cushion and such as may facilitate the desired inflation thereof.

To the housing first end 42, there is fitted or attached, such as by means of a crimp 50, a first end closure 52. The first end closure 52 includes an opening 54 therein wherethrough an initiator device 56 such as forms, at least in part, a portion of the chamber opener 35, is appropriately attached. Particular initiator devices for use in the practice of the invention can include any suitable type of initiator means including: bridgewire, spark-discharge, heated or exploding wire or foil, through bulkhead (e.g., an initiator which discharges through a bulkhead such as in the form of a metal hermetic seal), for example, and may, if desired, optionally contain a desired load of a suitable pyrotechnic charge.

The diffuser assembly 24 further includes, such as a part of the chamber opener 35, a generant canister 60. The generant canister 60 may advantageously be situated adjacent the first end closure 52 and particularly the initiator device 56, such as to facilitate the direct communication therewith by the initiator device 56 upon the actuation thereof. Such a generant canister 60 can desirably be formed of a metal, such as steel, copper, brass, aluminum or the like, for example. Further, such metal material of construction may, if desired, include a suitable coating such as to provide increased corrosion resistance, for example. In accordance with one preferred embodiment of the invention, a generant canister formed of steel with a tin coating has been found desirable and useful.

Within the generant canister 60 there is housed a charge, quantity or supply of a selected reactable gas generant material, such as represented by the solid pyrotechnic gas generant pellets, generally designated by the reference numeral 62. Gas generant materials for use in the practice of the invention can suitably take various forms including wafer, pellet and grain forms, for example. As described in greater detail below, in accordance with one preferred embodiment of the invention, the reactable gas generant material is reacted to form reaction products effective to rupture the generant canister and, upon heat transfer communication with the chamber contents 14, result in the expansion of the fluid such as to form an inflation medium for the inflation of an associated airbag cushion.

Various reactable gas generant materials, such as known in the art, can be used in the practice of the invention. In particular, those materials which produce a relatively large proportion of gaseous products and/or combust to produce a solid slag residual particulate mass which is relatively easily removable are generally preferred.

Preferred gas generant materials for use in the practice of the invention can desirably include or contain a combustible fuel and oxidizer combination. In accordance with one preferred embodiment of the invention, the fuel is preferably composed of an organic compound that is rich in nitrogen and oxygen content as such fuel materials can desirably reduce the amount of oxidizer required for combustion thereof. Specific examples of materials useful as such fuels include but are not limited to: guanidine nitrate, aminoguanidine nitrate, diamminoguanidine nitrate, triaminoguanidine nitrate, nitroguanidine, and nitrotriazalone; tetrazoles, bitetrazoles, and triazoles, and combinations thereof. In addition, transition metal nitrate, chlorate, or perchlorate complexes of organic compounds may be used as fuels. It is to be understood and appreciated that the fuel component of such gas generant materials may constitute one or more of such fuel materials, as may be desired for particular applications. In general, the fuel component will comprise about 10 to about 90 weight percent of the gas generant material formulation.

Specific examples of preferred oxidizer component materials for use in the practice of the invention include but are not limited to one or more of the following materials: ammonium nitrate, ammonium perchlorate, transition metal ammine nitrates, chlorates, and perchlorates; alkaline earth metal peroxides, nitrates, perchlorates, and chlorates; transition metal peroxides, nitrates, and perchlorates and alkali metal nitrates, chlorates, and perchlorates. In general, the oxidizer component will comprise about 20 to about 80 weight percent of the formulation.

In addition to fuel and oxidizer components such as described above, gas generant materials for use in the practice of the invention may desirably contain one or more additives such as to provide or result in improved processing, enhanced slag formation and reduced undesirable effluent gas production or release. Exemplary processing aids include but are not limited to organic binders, such as PVC, guar gum, polyacrylamide, polyacrylic acid, polyvinyl alcohol, etc. Preferred pressing processing aids include but are not limited to mica, calcium stearate, graphite, molybdenum disulfide, etc. Enhanced slag formation additives include but are not limited to silica, alumina, titania, zirconia, clays, and talcs. Additives useful in reducing undesirable effluent gases include but are not limited to alkali metal salts and alkali metal salts or transition metal complexes of tetrazoles and related nitrogen heterocycles. In practice, the content of such additives in the preferred gas generant formulations used in the practice of the invention generally does not exceed about 20 weight percent of the formulation.

In addition, gas generant compositions used in the practice of the invention may advantageously be coated with an ignition compound to increase the ignitability of the formulation, if desired. Useful ignition compounds typically include or contain a metal or metal hydride fuel such as boron, magnesium, aluminum, titanium hydride, or the like and an oxidizer typically an alkaline earth metal peroxide, nitrate, chlorate or perchlorate or alkali metal nitrate, chlorate, or perchlorate. In practice, igniter levels of about 1 to about 5 percent of the finished pyrotechnic composition on a weight basis have been found useful in particular embodiments of the invention.

In accordance with certain preferred embodiments of the invention, gas generant compositions used in the practice of the invention desirably provide or result in a sufficiently high burn rate with requiring the presence or application of an ignition material coating. For example, burn rate-enhanced high gas yield non-azide gas generants such as disclosed in prior U.S. patent application Ser. No. 09/221,910, filed Dec. 28, 1998, whose disclosure is hereby incorporated herein in its entirety, can beneficially be used in the practice of the invention.

Thus, a preferred gas generant material for use in the practice of the invention desirably contains between about 35 and about 70 wt % of guanidine nitrate fuel, between about 30 and about 55 wt % copper diamine dinitrate oxidizer, between about 2 and about 10 wt % silicon dioxide burn rate enhancing and slag formation additive, and between about 0 and about 25 wt % ammonium nitrate supplemental oxidizer.

A specific example of a preferred such gas generant material for use in the practice of the invention also desirably contains or includes a sufficient quantity or relative amount of ammonium sulfate or the like additive effective to result in a gas generant material which, upon reaction, produces or results in reduced quantities or relative amounts of undesirable $NO_x$ products, without significantly increasing the production of undesirable $SO_x$ products (where x typically equals 1 or 2). Preferred such gas generant materials desirably include or contain ammonium sulfate in an amount between about 2 and about 20 composition weight percent and, more preferably, in an amount up to about 15 composition weight percent, with such gas generant materials including or containing ammonium sulfate in an amount between about 4 and about 12 composition weight percent being particularly preferred. As will be appreciated, the presence or inclusion of ammonium sulfate in greater than preferred or desired relative amounts may result in reduced performance, such as measured by tank pressure for the gas output therefrom, as well as possibly greater than desired production of oxides of sulfur ($SO_x$). Further, the presence or inclusion of ammonium sulfate in lesser than preferred or desired relative amounts may make it difficult to 1) achieve significant reductions of undesirable $NO_x$ products and 2) ensure that the formulation attains sufficient compositional uniformity to provide or result in uniform and consistent results.

In practice, such ammonium sulfate-containing gas generant formulations desirably reduce the formation of nitrogen dioxide ($NO_2$) from the subject inflator devices with no apparent corresponding increase in nitric oxide (NO) formation. As those skilled in the art will appreciate, the specific mechanisms relating to the formation of $NO_x$ from the reaction of gas generant materials can be extremely complex, particularly where such formation occurs in the presence of either or both hydrocarbons (such as formed by or resulting from guanidine nitrate) and ammonia (such as formed by or resulting from ammonium sulfate). At the present time, it is believed that the reduced formation of $NO_2$ is at least in part due to the liberation of ammonia from the ammonium sulfate and, the subsequent reaction of at least a portion of such ammonia with available nitrogen dioxide. At the present time, the role of other chemical intermediate species is unclear.

Further, formulations such as detailed above but without the inclusion of additive material such as ammonium sulfate have been found to generally result in reaction products containing significantly higher or increased levels or relative amounts of $NO_2$. It is theorized that the ammonium group or resulting constituent or product of ammonium sulfate is effective to tie-up or otherwise occupy available nitrate groups ($NO_3$), such as present in ammonium nitrate but absent in ammonium sulfate. Thus, the incorporation of an additive such as an ammonium phosphate, such as $(NH_4)HPO$, $(NH_4)_2HPO_4$, or $(NH_4)H_2PO_4$, for example, which also exhibits an absence of the nitrate group, may produce or result in substantially the same effect on the level or relative amount of $NO_2$ present in resulting reaction products.

Returning to FIG. 1, while the utilization and inclusion of such a gas generant canister or housing 60 can facilitate inflator assembly and handling during processing, it is to be understood that the broader practice of the invention is not necessarily so limited. For example, the invention can, if desired, be practiced using an inflator wherein a selected gas generant material is directly or otherwise appropriately placed and contained within an associated diffuser housing.

The diffuser assembly 24 may, as shown, also include a combustion screen 64 or the like such as to screen or otherwise separate and desirably remove larger sized particulate material such as may form upon reaction of the reactable gas generant material. If included, such a combustion screen can be contained within the generant canister 60, as shown. Alternatively, such a combustion screen can be included within such a diffuser assembly externally adjacent the gas generant canister or otherwise downstream of the gas generant material.

The diffuser assembly 24 further includes, such as adjacently positioned relative to the generant canister 60, a flow control element 66. In this illustrated embodiment, the flow control element 66 includes a base portion 70, a neck portion 72 and forms a fluid flow conduit 73, such as in the form of a nozzle. In the illustrated embodiment, the flow control element 66 is secured within the diffuser assembly 24 by means of a crimp 74 formed by the diffuser housing 36 adjacent the flow control element base portion 70. In particular, the flow control element base portion 70 forms an indentation 75 along the outer wall 76 thereof. The indentation 75 is adapted to receive or otherwise cooperate with the diffuser housing crimp 74 such as to desirably secure the flow control element 66 within the diffuser assembly 24 in a non-movable manner.

In the particularly illustrated embodiment, the fluid flow conduit 73 is in the form of a nozzle having a discharge end 78 forming or having a discharge opening 79 wherethrough at least a portion of the discharge from the chamber opener 35, e.g., reaction products formed upon reaction of the reactable gas generant material 62 are desirably directed and transmitted into chamber-opening communication with the first chamber 12 and, in turn, communication with the expandable fluid 14 contained therewithin.

The first chamber 12 is enclosed at the sleeve first end 20 by means of a burst disk 80. As shown in FIG. 1, the housing second end 44 includes or has formed thereat a rupture disk support collar 82 whereto the burst disk 80 can desirably be sealed around the perimeter region thereof, generally designated by the reference numeral 84, such as to desirably provide a leak-free seal for the expandable fluid 14 normally contained or stored within the chamber 12. The burst disk 80, at a center portion 86 thereof, is desirably supported at least in part by the flow conduit discharge end 78.

In practice, the burst disk 80 is typically in the form of a thin disk such as fabricated or formed of a metal material such as Inconel 600 or Inconel 625. In practice, such a disk may typically have a thickness in the range of about 0.005 inch (0.127 mm) to about 0.010 inch (0.254 mm), for example.

It is to be understood that a disk support arrangement such as described above can advantageously result in the use of a burst disk of reduced thickness as compared to similar arrangements but wherein the associated disk lacks such support features. As will be appreciated, the use of a disk of reduced thickness can facilitate the desired rupture or opening of the disk, as described in greater detail below.

Under high pressure proof testing such as pressures in the range of about 4500 psi (31.0 MPa) to about 6000 psi (41.4 MPa), the disk 80 deforms against the support provided by the flow conduit discharge end 78 such as to provide or result in a first sealing portion 87. Such burst disk deformation desirably results in the disk 80 seating tightly against the flow conduit discharge end 78. Such tight seating of the disk 80 against the flow conduit discharge end 78 has been found to favorably influence the direct opening of the burst disk 80 such as via the impingement thereon of the reaction products produced by or resulting from the chamber opener 56, such upon the reaction of the gas generant material 62 contained within the diffuser assembly 24. In particular, such tight seating has in practice been found reliably sufficient whereby the direct physical joining of the burst disk to the flow conduit discharge end such as by means of an additional weld joinder is generally not required in order for the assembly to reliably result in the gas generant reaction products to be directed into the chamber 12 rather than, for example, flowing directly out of the diffuser assembly 24 such as via the exit ports 46 without first entering into the chamber 12. The avoidance of the need for an additional weld joinder at the center portion 86 simplifies and reduces manufacturing costs and can beneficially affect reliability associated with the manufacture and operation of the resulting inflator apparatus. It is to be understood, however, that the burst disk can, if desired, be joined or attached with or to the nozzle such as by being welded, brazed or bonded thereto, for example.

The disk 80 also deforms against the support provided by the support collar 82 and, as identified above, can be sealed around the perimeter region of disk such as to provide or result in a second sealing portion 88.

It will be appreciated that the burst disk can, if desired, include a score 89 such as to facilitate the desired opening of the burst disk. More specifically, the inclusion of such a score can be helpful in more specifically locating or positioning the site at which the burst disk 80 will initially open upon the direction of the gas generant reaction products from the fluid flow conduit 73 thereagainst.

As will be appreciated, such burst disk scoring can take various forms such as known in the art. For example, such a burst disk may include a score in the form of a cross or a circle, such as may be desired or particularly suited for a specific installation. Further, such a score may take the form of an indentation, marking or otherwise reduction in the thickness of the burst disk at selected area or portion thereof, as is known in the art.

If desired and as shown, the diffuser assembly 24 may additionally include a screen 90 or like device interposed between the burst disk 80 and the exit ports 46. As will be appreciated, the inclusion of such a screen or like device may be desired or helpful in removing undesired particulates and the like from the inflation gas prior to passage out of the inflator 10, through the exit ports 46.

Figure 2:
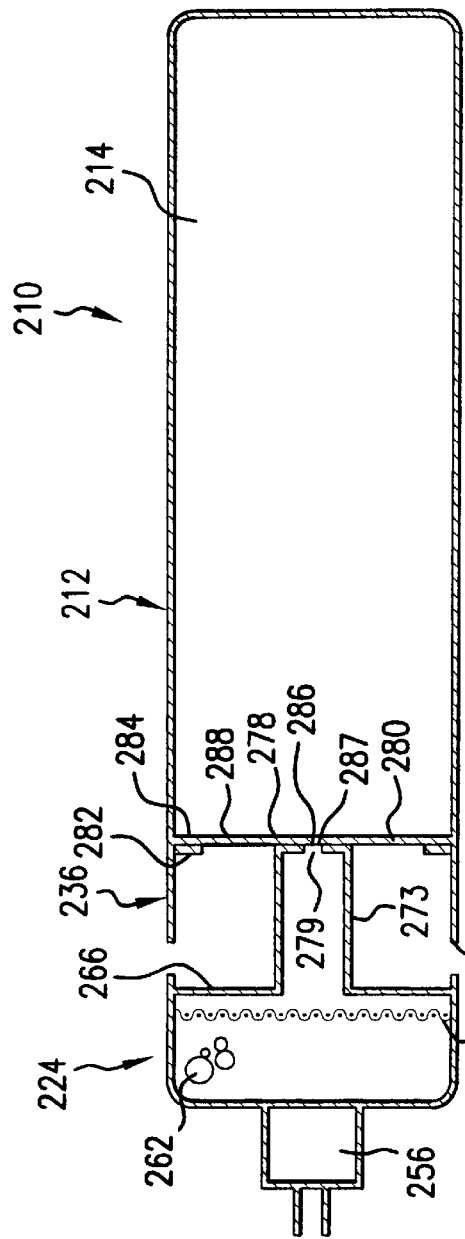
FIGS. 2–4 are simplified, partially in section, schematic drawings illustrating sequential operation of an airbag inflator in accordance with one embodiment of the invention. More specifically.
Figure 3:
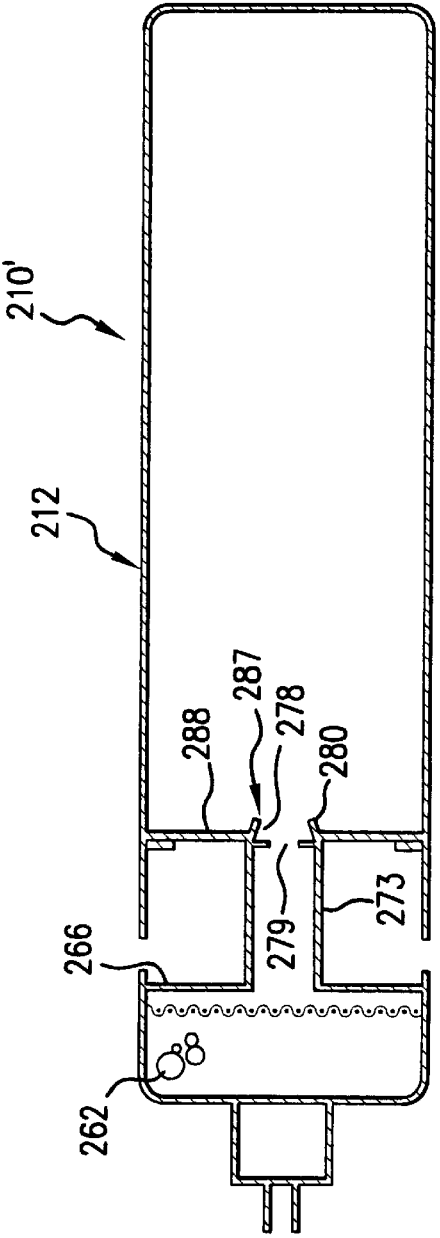
Figure 4:
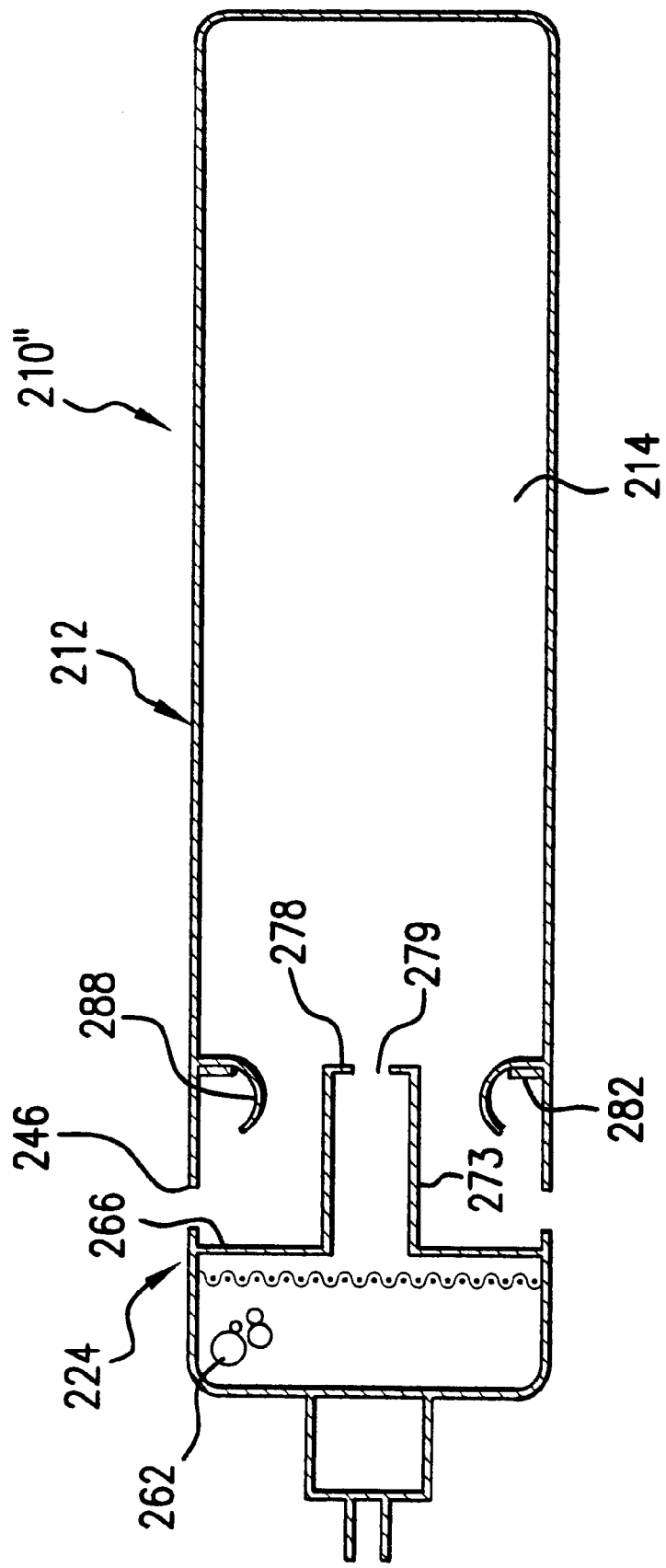

The manner of operation of an inflator apparatus in accordance with the invention will now be described in greater detail making reference to FIGS. 2–4. More specifically, FIGS. 2–4 schematically illustrate an inflator apparatus in accordance with one preferred embodiment of the invention at various selected points in the operation process thereof. In particular, FIG. 2 illustrates the inflator apparatus 210 in a "static" or what may be termed its normal state, similar to that shown in FIG. 1. FIG. 3 illustrates the same inflator apparatus (now designated 210') at an intermediate point in operation subsequent to actuation and prior to the discharge of inflation gas therefrom. FIG. 4 illustrates the same inflator apparatus (now designated by the reference numeral 210") at a subsequent or still later point in the operation thereof The inflator apparatus 210, as shown in FIG. 2, is generally the same as the inflator apparatus 10 shown in FIG. 1 and described above. For example, the inflator apparatus 210 includes a first chamber 212 filled and pressurized with an expandable fluid 214, such as in the form including an at least partially liquefied combination of a dissociative gas source material, e.g., nitrous oxide, and at least one selected unreactive dissociation reaction modifier, such as carbon dioxide, for example. The inflator apparatus 210 also includes a diffuser assembly 224 adjacent the first chamber 212.

The diffuser assembly 224 includes a housing 236 having plurality of exit ports 246, a chamber opener 256, such as at least in part in the form of an initiator device, a quantity or supply of a selected reactable gas generant material 262, a combustion screen 264, a flow control element 266 such as includes a fluid flow conduit 273 such as in the form of a nozzle and having a discharge end 278 forming or having a discharge opening 279 wherethrough reaction products formed upon reaction of the reactable gas generant material are desirably directed and transmitted into communication with the first chamber 212 and a burst disk 280. As shown, a rupture disk support collar 282 desirably provides support to a perimeter region 284 of the burst disk 280.

As described above relative to the embodiment illustrated in FIG. 1, the burst disk 280, at a center portion 286 thereof, is desirably supported by the flow conduit discharge end 279. Further, the burst disk 280 in cooperation with the flow conduit 273 forms a first sealing portion 287. Also, the disk support collar 282 provides a base to which the burst disk 280 can desirably be sealed such as to provide a leak-free seal for the expandable fluid normally contained or stored within the chamber 212. Further, the burst disk 280 in association with the support collar 282 forms a second sealing portion 288.

As will be appreciated, in FIGS. 2–4, certain simplifications have been made to simplify illustration and discussion. For example, FIGS. 2–4 do not illustrate the inclusion of various welds or crimps such as may desirably be utilized in the joining together of the component parts of the inflator device. Further, FIGS. 2–4 do not illustrate the inclusion of a gas generant canister such as described above relative to the inflator apparatus 10.

Operation

Typical operation of the inflator apparatus 210, shown in FIG. 2, is as follows:

Upon the sensing of a collision, an electrical signal is sent to the chamber opener initiator 256. The initiator 256 functions to ignite the gas generant material 262. The gas generant material 262 reacts, e.g., burns, to produce or form gaseous reaction products. The gaseous reaction products are passed through the screen 264, to the flow control element 266 and into the fluid flow conduit 273.

The conduit 273 directs the gas generant reaction products formed by or from the gas generant material 262 at or to the burst disk 280 resulting, as shown in FIG. 3, in the opening of the central portion 287 of the burst disk 280 when the pressure against the burst disk rises to a predetermined level or range. More specifically, the burst disk central portion 287 such as formed or positioned adjacent the flow conduit discharge end 278 and the opening 279 thereat, desirably ruptures or otherwise opens into or towards the first chamber 212.

With the rupture or otherwise opening of the diffuser assembly-supported burst disk central portion 287, the pressure within the first chamber 212 desirably results to result in initial opening of the burst disk second sealing portion 288. More specifically, the edges of the burst disk second sealing portion 288 desirably petal or otherwise open into or towards the diffuser assembly 224, as shown in FIG. 4.

With such opening of the burst disk second sealing portion 288, a portion of the quantity of unheated contents 214 is released from the first chamber 212. In particular, such released fluid is passed into the diffuser assembly 224 between the flow control element 266 and the disk support collar 282 and ultimately out the exits ports 246 into an associated inflatable vehicle occupant restraint (not shown).

Simultaneously with such opening of the burst disk second sealing portion 288, hot product gases produced upon combustion of the gas generant material 262, flow into the first chamber 212 via the flow conduit 273. As will be appreciated, the combustion products entering into the first chamber 212 must overcome the pressure gradient created by the contents 214 originally contained within the first chamber 212. Based on the teachings and guidance herein provided, conduit or nozzle design parameters such as including the exit area thereof can be selected or determined based on factors such as anticipated storage conditions within the chamber 212.

As described above, the hot gases contact and communicate with the remaining contents of the first chamber 212 resulting in the heating of such fluid and the increasing of the temperature of such fluid. The heated fluid and products formed or associated therewith are correspondingly passed or communicated with or through the diffuser assembly 224 and ultimately out the exits ports 246 into the associated inflatable vehicle occupant restraint.

Figure 5:
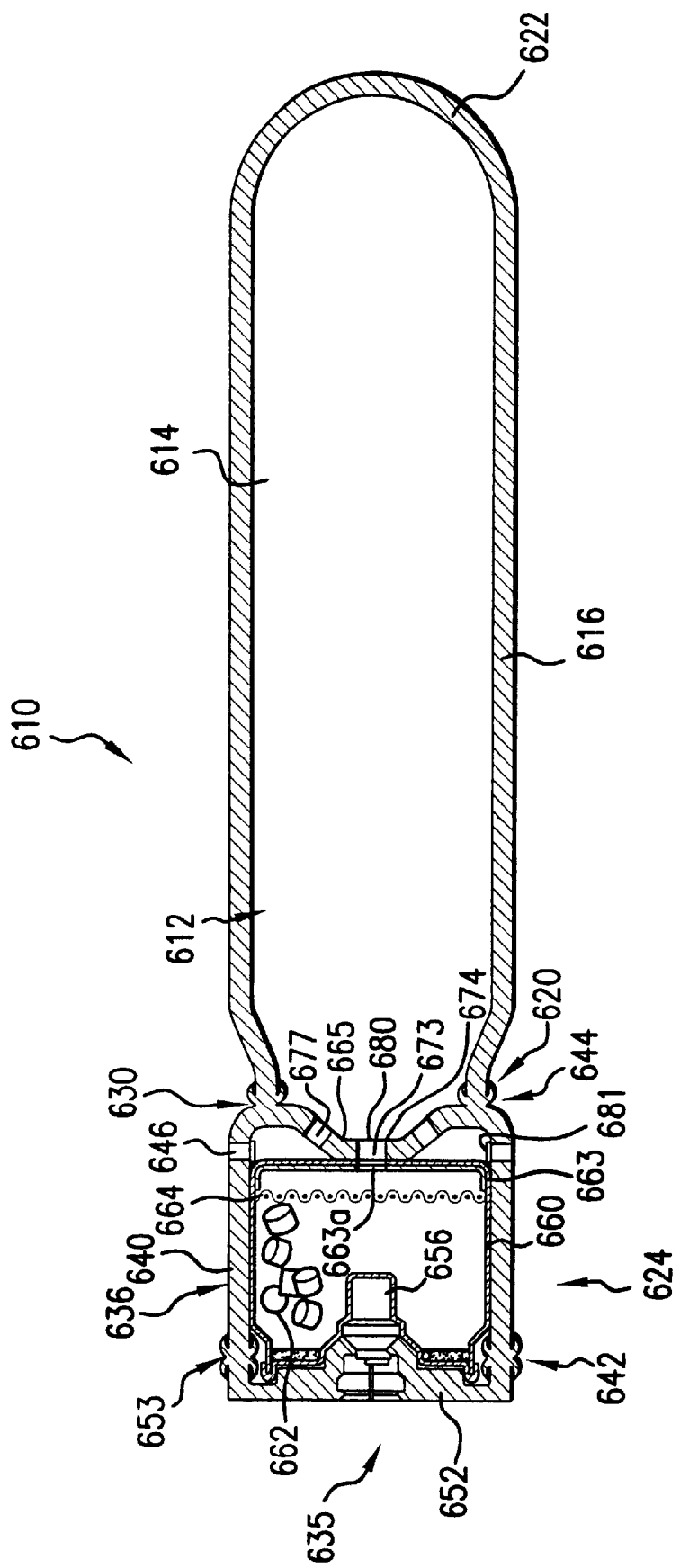
FIG. 5 is a partially in section, schematic drawing of an airbag inflator in accordance with an alternative preferred embodiment of the invention.

FIG. 5 illustrates an airbag inflator 610 in accordance with an alternative preferred embodiment of the invention. The inflator 610 is in some respects similar to the inflator 10 described above. For example, the inflator 610, similar to the inflator 10, includes a first or storage chamber 612 that is filled and pressurized with an expandable fluid 614 effective to provide a gaseous inflation medium.

As described above and in accordance with a preferred embodiment of the invention, such fluid contents desirably include at least one gas source material which, upon initiation, undergoes dissociation to form dissociation products used to inflate the inflatable device, and at least one unreactive dissociation reaction modifier. Further, each of such at least one gas source material and at least one unreactive dissociation reaction modifier is preferably in the nature of a compressed gas or a compressed gas mixture. Such compressed gases can be stored in gaseous, liquid or multi-phase form (i.e., partially gaseous and partially liquid mixture). As will be appreciated, the premium on size generally placed on modern vehicle design, generally results in a preference for smaller sized airbag inflators. In view thereof and the fact that the densities for such compressed gas materials are significantly greater when in a liquid, rather than gaseous form, storage of such compressed gas materials primarily in a liquid form is typically preferred.

The airbag inflator 610 differs from the inflator 10, described above, in that the chamber 612, rather than being defined by an elongated cylindrical sleeve having opposite first and second open ends, is defined by a generally cylindrical closed end bottle 616. As shown, such a chamber bottle 616 includes an open first end 620 and a closed second end 622 and may desirably be formed in a one piece construction. As will be appreciated, such a construction desirably may serve to reduce or eliminate the number of welds needed or used in the construction such as by eliminating the need for the welding of an end closure such to close one or more ends of the resulting storage chamber.

Further, while the invention has been described above with respect to the use of a fill port or the like to permit the introduction of materials within the storage chamber of inflator assemblies of the invention, it is to be understood that the broader practice of the invention is not so limited. For example, if desired a fill technique such as disclosed in above-identified commonly assigned U.S. Pat. No. 5,884, 938, may be employed. In accordance with such fill method, a cryogenically formed solid mass of a particular desired material is sealed within such a closed end bottle 616 without the use of a fill port. As a result, the corresponding chamber need not include a fill port and a potentially troublesome leak path from the chamber is eliminated.

Moreover, the airbag inflator 610 includes a diffuser assembly 624 of modified form, as described in greater detail below. More particularly, the diffuser assembly 624, such as generally described above relative to previously described embodiments, is formed or appropriately joined or attached to the bottle first end 620 such as by means of an inertial weld 630. The diffuser assembly 624, similar to the above-described embodiments, serve as, contains or holds a chamber opener 635, actuatable to produce a discharge effective to open the first chamber 612 by non-mechanical means. The diffuser assembly 624 includes a cup-shaped housing 636 which includes a side wall 640, an open first end 642 and a closed second end 644. The side wall 640 includes a plurality of exit ports 646, wherethrough the inflation gas from the inflator 610 and, particularly the diffuser assembly 624, is properly dispensed into an associated airbag cushion (not shown).

A diffuser housing end closure 652 is joined to the housing first end 642 such as by means of an inertial weld 653. As will be appreciated, such form or means of end closure joinder may assist in one or more of the following respects: simplify construction, reduce weight and reduce the costs associated therewith.

The diffuser assembly 624 includes, such as a part of the chamber opener 635, an initiator device 656 and a generant canister 660, such as described above. Within the generant canister 660 there is housed a charge, quantity or supply of a selected reactable gas generant material 662 such as described above and such as may be reacted to form reaction products effective to rupture the generant canister and, upon heat transfer communication with the expandable fluid, result in the expansion of the fluid such as to form an inflation medium for the inflation of an associated airbag cushion.

The generant canister 660 also contains, includes or has associated therewith a combustion canister cap 663 such as located at the downstream end of the gas generant canister 660. The inclusion of such a combustion canister cap or the like may be desired in specific embodiments such as to lend structural support to the gas generant canister 660 such to prevent or avoid rupture or opening of the generant canister at a location other than desired. In the illustrated inflator apparatus 610, the combustion canister cap 663 is enclosed within the gas generant canister 660 and serves as a support or base for the associated combustion screen 664 also contained within the canister 660.

The combustion canister cap 663 is desirably formed or constructed of lightweight, high strength metal or the like such as commonly employed in inflator constructions. The cap 663 include a central orifice or opening 663a wherethrough the discharge from the gas generant canister 660 can be desirably or otherwise properly directed towards the chamber 612.

The diffuser assembly 624 also includes a flow control element 665 of modified design. In particular, the flow control element 665 is in the general form of an orifice plate formed such as to close the second end 644 of the diffuser housing 636. The flow control element 665 forms, includes or otherwise contains a fluid flow conduit 673, in particular, the fluid flow conduit 673 is formed, at least in part, as an orifice 674. As will be appreciated, an orifice plate may include such an orifice form fluid flow conduit variously placed or positioned thereon. In practice, however, such an orifice form fluid flow conduit typically may be desirably centrally placed or positioned on the orifice plate control element 665.

The orifice plate control element 665 also includes storage chamber exit ports 677 wherethrough inflation medium from the storage chamber 612 can be passed into the diffuser assembly 624 for subsequent passage out of the inflator 610 through the ports 646. As will be appreciated, the size, placement and number of storage chamber exit port 677 can be desirably selected to desirably and properly control the flow rate of inflation medium from the inflator apparatus 610.

As shown, the storage chamber exit ports 677 and the flow conduit orifice 673 are desirably sealed by means of a burst disk 680 applied onto the storage chamber side of the orifice plate control element 665.

The gas generant canister 660, with its associated underlying combustion canister cap 663, is designed for placement in directed contact with the orifice plate control element 665 such as to create or form a seal between the canister 660 and the flow control element 665 and thereby avoid or prevent combustion products formed by the reaction of the gas generant to exit from the inflator 610 through the exit ports 646 without passing through the orifice 674 and, in turn, into the chamber 612.

Alternatively, or in addition, a rupturable covering such as in form of a metal foil, can be applied over the exit ports 646 to prevent the undesired passage of material therethrough.

In FIG. 5, the combustion canister cap opening 663a and the orifice plate control element orifice 674 are shown as having identical diameters but the broader practice of the invention is not necessarily so limited. For example, in certain applications it may be desirable to make the orifice plate control element orifice of smaller diameter than the combustion canister cap opening so as to increase the pressure required to rupture the associated burst disk. In addition, such differential sizing can serve to prevent the possibility of combustion products formed by the reaction of the gas generant to exit from the inflator through the exit ports without passing through the orifice and, in turn, into the associated storage chamber.

If desired and as shown, the diffuser assembly 624 can include filters 681, such as in the form of metal screen, adjacent to the exit ports 646 to prevent undesired passage of particulate or burst disk fragments from the inflator 610 into an associated airbag cushion.

The use of such a plate form fluid flow control element can desirably reduce the length of the resulting inflator apparatus and thus reduce the envelope required for the installation of such a designed system into a vehicle. Further, the airbag inflator apparatus 610 includes at least the following specific features or modifications such as may desirably serve to improve performance, reduce cost or both:

1. closed end bottle construction;
2. elimination of fill port;
3. welded diffuser housing end closure; and
4. modified form flow control element.

It is to be understood that inflator apparatus in accordance with the invention can accordingly be provided in various "adaptive" inflation system forms, such as will be apparent to those skilled in the art and guided by the teachings herein provided. With an adaptive inflatable restraint system, one or more parameters such as the quantity, supply, and rate of supply of inflation gas, for example, can be selectively and appropriately varied dependent on one or more selected operating conditions such as ambient temperature, occupant presence, seat belt usage, seat position of occupant and rate of deceleration of the motor vehicle, for example.

Further, those skilled in the art and guided by the teachings herein provided, will appreciate that dissociation reactions, such as involving the dissociation of nitrous oxide and for the range of pressures here of interest, commonly follow a unimolecular decomposition reaction mechanism. More specifically, the rate of conversion of reactants to products for such reactions is generally determinable using a unimolecular reaction expression wherein the specific reaction rate coefficient is independent of pressure. As a result, the rate of conversion of reactants to products is essentially directly proportional to the reactant concentration (e.g., nitrous oxide concentration) in the first order. In contrast, combustion reactions (such as even those involving combustion of a hydrocarbon with nitrous oxide) are typically governed by bimolecular reaction mechanisms. Such bimolecular reaction mechanisms are generally believed to be much more sensitive to pressure effects and therefore reaction parameters associated with such reactions, such as gas production rate, internal pressure, rise rate, etc., are generally much more difficult to control. Thus, dissociation-based gas supply devices, such as described herein provide significant practical advantages as compared to such combustion-based gas supply devices.

The present invention is described in further detail in connection with the following examples which either or both illustrate or simulate various aspects involved in the practice of the invention. It is to be understood that all changes that come within the spirit of the invention are desired to be protected and thus the invention is not to be construed as limited by these examples.

EXAMPLES

Examples 1–3

In these examples, three test inflators identical in structure to the inflator illustrated in FIG. 1 were built. Each of the test inflators included a generally cylindrical fluid flow conduit nozzle (item 73 in FIG. 1) having a diameter of 0.323 inches (8.2 mm) and four circular exit ports (item 46 in FIG. 1) each of which had a diameter of 0.201 inches (5.11 mm). Each of the test inflators was filled with 140 grams of a mixture consisting of 50% nitrous oxide and 50% carbon dioxide. The internal volume of the storage chamber in each of the test inflators was about 11.5 in$^3$ (188.5 cm$^3$), which resulted in a storage pressure of about 860 psia (5.93 MPa) at a temperature of 21° C. Each of the test inflators contained a pyrotechnic generant load of 26.0 grams of roughly cylindrical pellets 0.25 inches×0.80 inches (6.35 mm×20.32 mm). Given dissociation of 30% of the stored nitrous oxide and gas generation from the pyrotechnic source, the total expected molar output from each of the test inflators was 4.3 gmol.

Each of the test inflators was tested at one of three different temperatures of operation, in accordance with TABLE 1.

TABLE 1

| Example | Temperature (° C.) |
|---------|--------------------|
| 1 | −35 |
| 2 | 21 |
| 3 | 85 |

To ensure that each test inflator had achieved uniformity of temperature, each inflator was conditioned at its particular test temperature for two hours prior to test operation.

Figure 6:
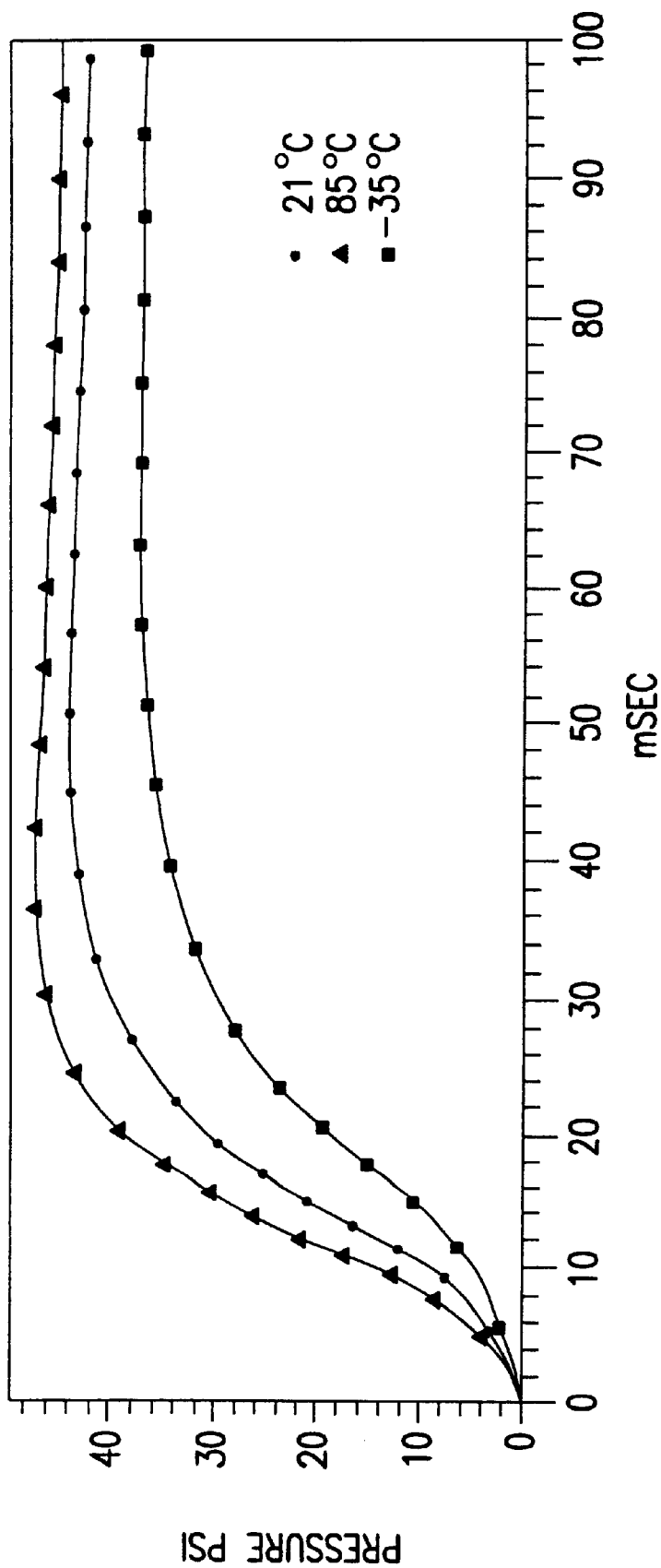
FIG. 6 is a graphical depiction of tank pressure as a function of time performance realized in Examples 1–3.
Figure 7:
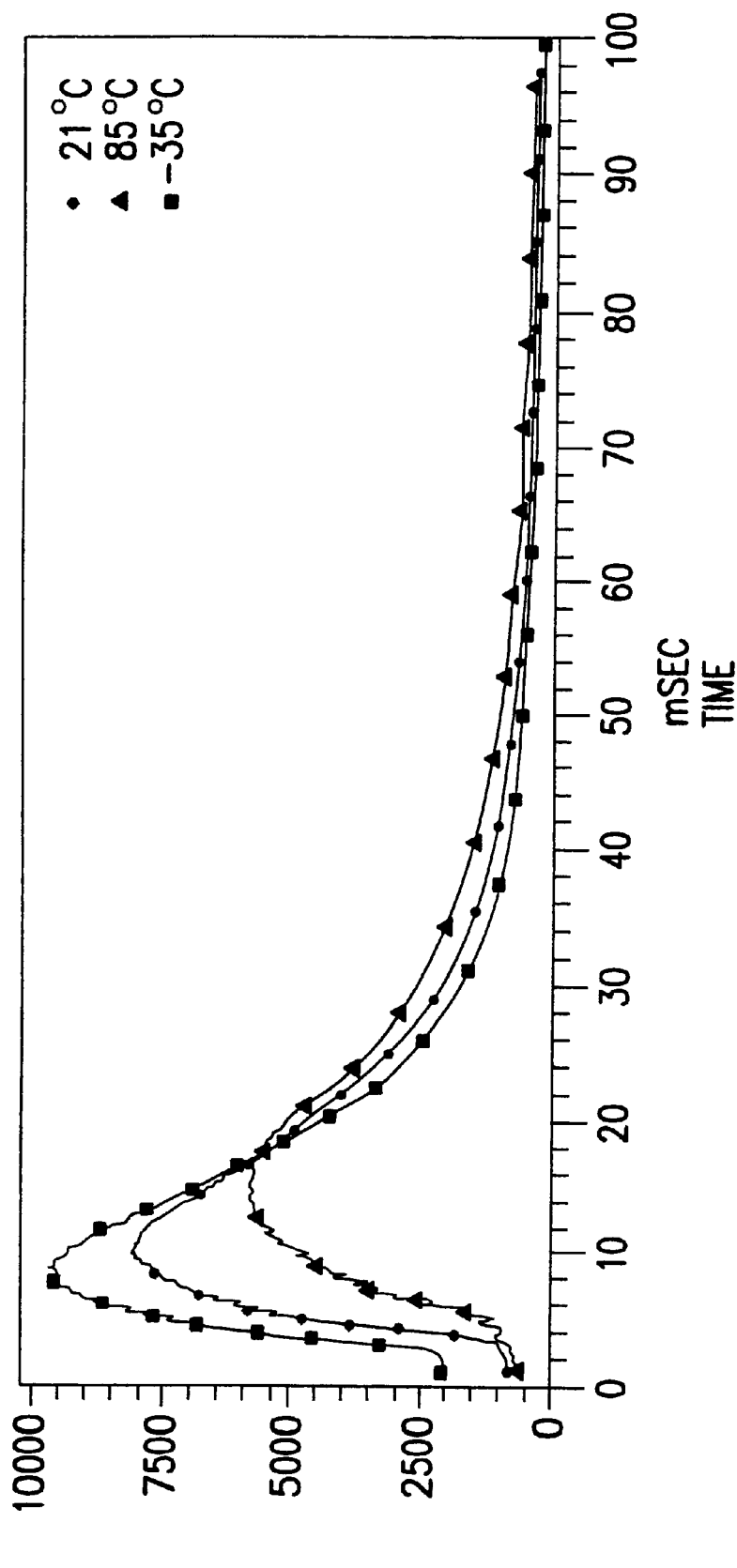
FIG. 7 is a graphical depiction of storage chamber pressure as a function of time performance realized in Examples 1–3.

FIGS. 6 and 7 illustrate the performance realized with the test inflators of EXAMPLES 1–3. More particularly, FIGS. 6 and 7 are graphical depictions of tank pressure and storage chamber pressure, each as a function of time subsequent to inflator actuation, respectively, for the inflators of EXAMPLES 1–3.

DISCUSSION OF RESULTS

As detailed below, the rate of pressure increase (rise rate) as well as the maximum tank and storage chamber pressures were typical of those observed with typical hybrid inflators. Such performance was achieved using inflator devices in accordance with the invention and which inflators: 1) are of significantly reduced envelope, as compared to such typical hybrid inflators; 2) avoid the inclusion or reliance on moving parts while maintaining desired levels of performance (e.g., attain or achieve inflation discharge in accordance with an "S" curve manner) and 3) are of simpler design and construction, such as may reduce the cost associated therewith.

The rate of pressure increase (rise rate) and the maximum tank pressure, shown in FIG. 6 for the test inflators of each of EXAMPLES 1–3, were typical of those inflators required for passenger applications. As the flow through area of the flow control element (i.e., the flow through area of the conduit nozzle) and the size and number of exit ports strongly influence the rise rate, it appears that the test inflators were properly dimensioned in these respects.

The pressures measured within the fluid storage chamber are shown in FIG. 7. It is interesting to note the dependence of the initial pressures (at t=0 ms) on ambient temperature. As mentioned above, given the internal volume and fluid load conditions within the chamber, the initial pressure at a temperature of 21° C. is approximately 860 psia (5.93 MPa). However, at a temperature of 85° C., the internal pressure is about 2000 psia (13.79 MPa), while at −35° C., the initial pressure is only about 650 psia (4.48 MPa). As those skilled in the art and guided by the teachings herein provided, at least in part due to the presence of liquefied gases, the fluid behavior is highly non-ideal.

As shown by the sharp increase in the pressure traces shown in FIG. 7, at a time interval of about three milliseconds following actuation (i.e., t=3 ms), it appears that the structural integrity of the nozzle burst disc ("first sealing portion") was exceeded and hot combustion products began to flow into the fluid storage chamber. The maximum pressures achieved in the storage chamber were typical of those observed in typical hybrid inflators. In particular, such performance was achieved with test inflators having an internal storage chamber volume of 11.5 in$^3$ (188.5 cm$^3$) whereas typical gas filled hybrid inflators would, dependent on the specific nature of the gases used therein, require a gas storage volume of about 21 in$^3$ (344.1 cm$^3$) to provide similar pressure performance.

Examples (EX) 4–7 and Comparative Examples (CE) 1–4

In EXAMPLES 4–7, the internal pressure versus temperature behavior of a 100 cc (6.1 in$^3$) inflator test fixture containing a 50/50 molar mixture of nitrous oxide and carbon dioxide in load densities of 0.539 g/cc, 0.649 g/cc, 0.704 g/cc, and 0.795 g/cc, respectively, was monitored. The results are illustrated in FIG. 8.

Given these load densities, the approximate liquid fill fractions in these Examples at a temperature of 21° C. (70° F.) were 60%, 78%, 85% and 100%, respectively.

Figure 8:
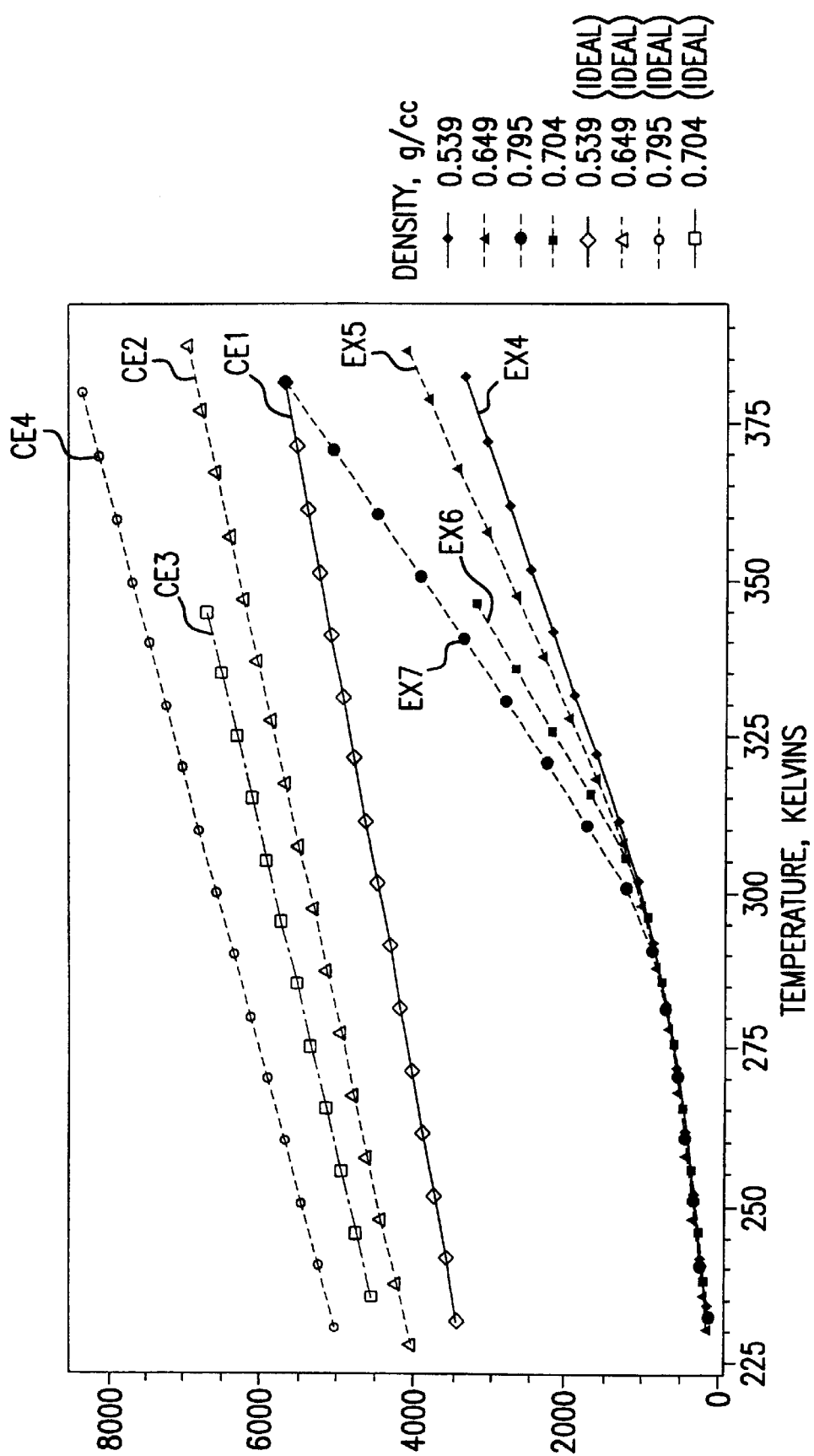
FIG. 8 is a graphical depiction of pressure versus temperature for fluid mixtures in accordance with one embodiment of the invention and an ideal gas at selected load densities.

From an examination of FIG. 8 it is clear that higher loading densities may result in a more severe rise rate in pressure as the temperature is increased. For example, in EX 6, the pressure began to increase very sharply at a temperature of about 305 K (32° C.). On the other hand, the steep portion of the pressure curve in EX 4 occurred at a temperature of about 315 K (42° C.). One will also observe that the rate of pressure increase in EX 6 is greater, as compared to the rate of pressure increase in EX 4. This difference is attributable to more liquid being initially present in EX 6 as compared to EX 4.

As shown, as the system temperature increases, the pressure also increases. However, when the liquid expands such that the liquid occupies the entire available volume, subsequent increases in pressure become more dramatic. As will be appreciated, this effect will be realized sooner (i.e., occur at a lower temperature) where the initial liquid fill fraction is greater.

FIG. 8 also illustrates, for COMPARATIVE EXAMPLES 1–4, the internal pressure versus temperature behavior of a chamber which contains an ideal gas at the load densities of 0.539 g/cc, 0.649 g/cc, 0.704 g/cc, and 0.795 g/cc, respectively.

FIG. 8 clearly illustrates the difference in pressure performance for fluid mixtures in accordance with the invention (EX 4–7) and ideal gas behavior (CE 1–4). For example, for loading densities generally preferred for automotive vehicle airbag applications (e.g., loading densities in the range of about 0.50 to about 0.70 g/cc) at a temperature of about 295 K, the liquefied gas storage pressure is roughly about 3500 to about 4500 psia (about 24.1 to about 31.7 MPa) lower for the subject fluid mixtures, as compared to that of ideal gas behavior.

It is to be understood that the discussion of theory, such as the discussion of gas generant material inclusion of additive material effective to result in a gas generant material which, upon reaction, produces or results in reduces quantities or relative amounts of undesirable $NO_x$ products, without significantly increasing the production of undesirable $SO_x$ products (where x typically equals 1 or 2) and the mechanism by which such additive works or functions, for example, is included to assist in the understanding of the subject invention and is in no way limiting to the invention in its broader application.

Thus, the invention provides an inflation apparatus and techniques for inflating an inflatable device wherein one or more apparatus parameters such as weight, cost, complexity, and size, for example, can desirably be reduced or minimized to a greater extent than otherwise or previously possible or realizable while providing required or desired performance capabilities.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. In an apparatus for inflating an inflatable device, the apparatus includes a first chamber having contents which include at least one gas source material which, upon initiation, undergoes dissociation to form dissociation products used to inflate the inflatable device, the improvement comprising:

at least one unreactive dissociation reaction modifier selected from a group consisting of $CO_2$, Xe, $SF_6$ and mixtures thereof stored at least partially in liquefied form in fluid contact with the at least one gas source material in the first chamber, the at least one unreactive dissociation reaction modifier effective to moderate at least one of the temperature and concentration of the at least one gas source material in the first chamber upon the dissociation of at least a portion of the at least one gas source material and with the first chamber contents having an equivalence ratio of less than 0.25.

2. The apparatus of claim 1 wherein the at least one gas source material comprises nitrous oxide.

3. The apparatus of claim 2 wherein the at least one unreactive dissociation reaction modifier includes $CO_2$.

4. The apparatus of claim 1 wherein the at least one unreactive dissociation reaction modifier includes $CO_2$.

5. The apparatus of claim 4 wherein the first chamber contents consist essentially of nitrous oxide and $CO_2$.

6. The apparatus of claim 1 wherein at least one of the at least one gas source material and the at least one unreactive dissociation reaction modifier is introduced within the first chamber in a solid form.

7. The apparatus of claim 6 wherein the solid form comprises at least one cryogenically-formed solid.

8. The apparatus of claim 7 wherein the at least one cryogenically-formed solid comprises the at least one gas source material.

9. The apparatus of claim 8 wherein the at least one gas source material comprises nitrous oxide.

10. The apparatus of claim 7 wherein the at least one cryogenically-formed solid comprises the at least one unreactive dissociation reaction modifier.

11. The apparatus of claim 10 wherein the at least one unreactive dissociation reaction modifier comprises $CO_2$.

12. The apparatus of claim 7 wherein the at least one cryogenically-formed solid comprises a combination of at least the at least one gas source material and the at least one unreactive dissociation reaction modifier.

13. The apparatus of claim 7 wherein the at least one cryogenically-formed solid comprises a combination of at least nitrous oxide and $CO_2$.

14. The apparatus of claim 1 wherein the first chamber contents additionally include a quantity of oxidative material.

15. The apparatus of claim 1 additionally comprising a chamber opener including an initiator device and an associated supply of reactant material.

16. The apparatus of claim 15 wherein the reactant material comprises an additive effective whereby, upon reaction of the reactant material, $NO_x$ products are present in a reduced amount as compared to reaction of the same reactant material without the additive.

17. The apparatus of claim 16 wherein the additive comprises ammonium sulfate.

18. The apparatus of claim 17 wherein the reactant material comprises ammonium sulfate in an amount between about 2 and about 20 composition weight percent.

19. A method for inflating an inflatable safety device in a vehicle, said method comprising:

initiating, within a first chamber having contents at an equivalence ratio of less than 0.25, an at least partially liquefied inflation gas-resulting combination including at least one gas source material and at least one unreactive dissociation reaction modifier selected from a group consisting of $CO_2$, Xe, $SF_6$ and mixtures thereof whereby at least a portion of the at least one gas source material dissociates to form dissociation products including at least one gaseous dissociation product and the at least one unreactive dissociation reaction modifier moderates at least one of the temperature and concentration of the at least one gas source material in the first chamber and releasing inflation gas comprising at least a portion of the at least one gaseous dissociation product and the at least one unreactive dissociation reaction modifier from the first chamber to inflate the inflatable safety device.

20. The method of claim 19 wherein the at least one gas source material comprises nitrous oxide.

21. The method of claim 20 wherein the at least one unreactive dissociation reaction modifier includes $CO_2$.

22. The method of claim 19 wherein the at least one unreactive dissociation reaction modifier includes $CO_2$.

23. The method of claim 22 wherein the first chamber contents consist essentially of nitrous oxide and $CO_2$.

24. The method of claim 19 additionally comprising the step of introducing at least one of the at least one gas source material and the at least one unreactive dissociation reaction modifier into the first chamber in a solid form.

25. The method of claim 24 wherein the solid form of the at least one of the at least one gas source material and the at least one unreactive dissociation reaction modifier comprises a cryogenically-formed solid.

26. The method of claim 25 wherein the at least one cryogenically-formed solid comprises the at least one gas source material.

27. The method of claim 26 wherein the at least one gas source material comprises nitrous oxide.

28. The method of claim 25 wherein the at least one cryogenically-formed solid comprises the at least one unreactive dissociation reaction modifier.

29. The method of claim 28 wherein the at least one unreactive dissociation reaction modifier comprises $CO_2$.

30. The method of claim 25 wherein the cryogenically-formed solid comprises a combination of at least the at least one gas source material and the at least one unreactive dissociation reaction modifier.

31. The method of claim 25 wherein the cryogenically-formed solid comprises a combination of at least nitrous oxide and $CO_2$.

32. The method of claim 19 wherein the first chamber additionally contains a quantity of oxidative material.

33. The method of claim 19 wherein the initiating of an at least partially liquefied inflation gas-resulting combination comprises the steps of reacting a quantity of a reactant material comprising a gas generant material to form gas generant reaction products and contacting the at least partially liquified inflation gas-resulting combination with the gas generant reaction products.

34. The method of claim 33 wherein the reactant material additionally comprises an additive effective whereby, upon reaction of the reactant material, $NO_x$ products are present in a reduced amount as compared to reaction of the same reactant material without the additive.

35. The method of claim 34 wherein the additive comprises ammonium sulfate.

36. The method of claim 35 wherein the reactant material comprises ammonium sulfate in an amount between about 2 and about 20 composition weight percent.

37. The method of claim 33 wherein the contacting of the at least partially liquified inflation gas-resulting combination with the gas generant reaction products comprises passing at least a portion of the gas generant reaction products into the first chamber.

38. An apparatus for inflating an inflatable device, the apparatus comprising:

a first chamber having contents at an equivalence ratio of less than 0.25 and consisting essentially of nitrous oxide and carbon dioxide, wherein the nitrous oxide and carbon dioxide are in an at least partially liquefied form and wherein, upon initiation, at least a portion of the nitrous oxide undergoes dissociation to form dissociation products used to inflate the inflatable device.

* * * * *